US010223232B2

(12) United States Patent
Eckert (10) Patent No.: US 10,223,232 B2
(45) Date of Patent: Mar. 5, 2019

(54) SYSTEM AND METHOD FOR RECORDING THE BEGINNING AND ENDING OF JOB LEVEL ACTIVITY IN A MAINFRAME COMPUTING ENVIRONMENT

(71) Applicant: Teracloud SA, Luxembourg (LU)

(72) Inventor: Paul J. Eckert, Newtown Square, PA (US)

(73) Assignee: TERACLOUD SA, Luxembourg (LU)

( * ) Notice: Subject to any disclaimer, the term of this patent is extended or adjusted under 35 U.S.C. 154(b) by 0 days.

(21) Appl. No.: 14/716,029

(22) Filed: May 19, 2015

(65) Prior Publication Data

US 2015/0347260 A1 Dec. 3, 2015

Related U.S. Application Data

(60) Provisional application No. 62/005,218, filed on May 30, 2014.

(51) Int. Cl.
| | | |
|---|---|---|
| *G06F 9/44* | (2018.01) | |
| *G06F 11/20* | (2006.01) | |
| *G06F 11/34* | (2006.01) | |
| *G06F 9/46* | (2006.01) | |

(52) U.S. Cl.
CPC ............... *G06F 11/34* (2013.01); *G06F 9/44* (2013.01); *G06F 11/3476* (2013.01); *G06F 11/2094* (2013.01); *G06F 2201/835* (2013.01)

(58) Field of Classification Search
None
See application file for complete search history.

(56) References Cited

U.S. PATENT DOCUMENTS

| | | | | |
|---|---|---|---|---|
| 5,088,036 A * | 2/1992 | Ellis | ..................... | G06F 12/0269 707/999.206 |
| 5,142,675 A * | 8/1992 | Oi | ......................... | G06F 9/4812 718/104 |
| 5,632,032 A * | 5/1997 | Ault | ..................... | G06F 11/3664 714/E11.21 |
| 6,640,217 B1 * | 10/2003 | Scanlan | ............ | G06F 17/30569 |
| 2002/0069031 A1 | 6/2002 | Lehman | | |
| 2003/0084071 A1 | 5/2003 | Iulo | | |

(Continued)

OTHER PUBLICATIONS

International Search Report for International Application No. PCT/IB2015/000753, dated Aug. 24, 2015, 4 pages.

(Continued)

*Primary Examiner* — Wei Y Zhen
*Assistant Examiner* — Binh K Luu
(74) *Attorney, Agent, or Firm* — RatnerPrestia (57) ABSTRACT

A system writes to a replicated direct access storage device (DASD) a record of each step within a job as each step begins and as each step completes. The records are maintained on the replicated DASD for a predetermined period of time. The predetermined period of time is, for example, the greatest amount of lag in replication of all storage systems operating within the system. The records are stored, for example, in an open jobs and datasets (OJD) file, where the file itself is a dataset. The dataset is written to by an online task (e.g., OJDSTC) which gathers input from two sources. Upon job completion, the records are stored, for example, in an OJD journal and removed from the OJD file.

20 Claims, 5 Drawing Sheets (56) References Cited

U.S. PATENT DOCUMENTS

| | | | |
|---|---|---|---|
| 2006/0184741 A1* | 8/2006 | Hrusecky | G06F 12/084 711/130 |
| 2006/0218556 A1* | 9/2006 | Nemirovsky | G06F 9/3851 718/104 |
| 2007/0299631 A1 | 12/2007 | Macbeth et al. | |
| 2009/0320001 A1* | 12/2009 | Bates | G06F 11/3636 717/129 |
| 2011/0296425 A1* | 12/2011 | Fukuda | G06F 9/4881 718/102 |
| 2012/0240126 A1* | 9/2012 | Dice | G06F 9/526 718/104 |
| 2013/0325913 A1 | 12/2013 | Kusaka et al. | |
| 2015/0301861 A1* | 10/2015 | LaChiusa | G06F 11/3072 718/102 |
| 2015/0347236 A1* | 12/2015 | Eckert | G06F 11/1435 711/162 |
| 2016/0307145 A1* | 10/2016 | Banerjee | G06Q 10/063116 |

OTHER PUBLICATIONS

International Preliminary Report on Patentability and Written Opinion for International Application No. PCT/IB2015/000753, dated Dec. 6, 2016, 7 pages.
Communication pursuant to Article 94(3) EPC issued in EPO Application No. 15 731 100.2 dated Oct. 18, 2017, 5 pages.

* cited by examiner

SYSTEM AND METHOD FOR RECORDING THE BEGINNING AND ENDING OF JOB LEVEL ACTIVITY IN A MAINFRAME COMPUTING ENVIRONMENT

TECHNICAL FIELD

The present examples relate to techniques and processes for recording the time each step begins and ends within a job executing within a mainframe computing environment.

BACKGROUND

Mainframe computing is a computing platform used today by the largest companies in the world. A mainframe often processes many workloads such as accounts receivable, general ledger, payroll and a variety of applications needed for specific business requirements. These workloads are commonly referred to as jobs.

A mainframe is a complex environment consisting of databases and datasets (i.e., files). These data typically reside on a direct access storage device (DASD) or disk drive. In addition to DASD, mainframe applications also rely on one or more tape drives/devices to store portions of these data. Tape drive(s) can be the primary repository of vital information within a mainframe application. Tape today can be either physical tape which must be mounted on hardware to be read or virtual tape which is disk-based storage emulating physical tape.

Mainframe computers process information in one of two modes of operation, online or batch. An online system, for example, provides an interactive application interface for interaction by customers and employees. In contrast, a batch system, for example, involves non-interactive processing of an application (e.g., generating statements) in which the application is started and runs without intervention until it completes. Both batch and online applications exist and run in predetermined cycles to automate data processing for an organization.

Replication is the process of creating an exact copy of a particular storage system, either DASD or tape. In replicated batch environments, multiple devices (e.g., primary storage system and replicated storage system) are generally kept to a certain consistency point. That is, the data on the primary storage system is timed at the same exact point on the replicated storage system. A consistency group is a collection of storage to be maintained in a consistent state (e.g., consistency group A includes volume A and tape drive 1, consistency group B includes volumes B and C).

While replication occurs at a point in time, data processing typically doesn't stop at that point in time during the replication. Furthermore, replication, especially when tape-based storage systems are involved, requires processing time, even if nominal, to create the copy. Thus, the replicated copy, by its very nature, may already be outdated at the point in time of the replication.

In addition, a particular mainframe application may utilize various datasets stored across various primary storage systems that may include both DASD and tape. Replication is performed, for example, for each individual storage system. As such, replication of each of the various datasets utilized by the particular mainframe application may occur at different times.

SUMMARY

What is needed, therefore, is a technique and process for recording the time at which each job and each step within the job begins and ends. Each time record is written, for example, to replicated DASD and maintained, for example, for at least as long as the time required for one replication event to complete for any storage system utilized by a particular mainframe application. Often these data would be kept longer.

An example of an article of manufacture described in detail below includes a non-transitory machine readable medium and a program embodied in the medium. In the article of manufacture example, execution of the program by a processor supports functions, including functions to receive an indication of an activity related to a job and determine whether the job is vital. The job, in the example, includes references to programs to be executed by the processor as a batch process. Additional functions are supported such that, if a job is determined to be vital, a record of the job related activity is generated and stored in a job activity record storage area. The job related activity includes, for example, initiation of the job, opening a closed dataset by the job, closing an opened dataset by the job, termination of a step of the job, failure to open a closed dataset by the job, and termination of the job.

An example of a method described in detail below includes the steps of receiving, by a process executing on a processor, an indication of an activity related to a job and determining, by the process executing on the processor, whether the job is vital. In this method example, the job includes references to programs to be executed by the processor as a batch process. The method includes further steps of, if the job is determined to be vital, generating a record of the activity related to the job and storing the record of the activity in a job activity record storage area. The job related activity includes, for example, initiation of the job, opening a closed dataset by the job, closing an opened dataset by the job, termination of a step of the job, failure to open a closed dataset by the job, and termination of the job.

A system example described in detail below includes a processor, a storage device accessible by the processor and a program stored in the storage device. In the system example, execution of the program by the processor configures the system to implement functions, including functions to receive an indication of an activity related to a job and determine whether the job is vital. The job, in this system example, includes references to programs to be executed by the processor as a batch process. Additional functions are implemented such that, if a job is determined to be vital, a record of the job related activity is generated and stored in a job activity record storage area. The job related activity includes, for example, initiation of the job, opening a closed dataset by the job, closing an opened dataset by the job, termination of a step of the job, failure to open a closed dataset by the job, and termination of the job.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

In an example mainframe environment, a job is a collection of programs, or job steps, instructing a processor to perform particular functions. When a job is represented as a sequence of job control language (JCL) statements, each job step is defined by an EXEC statement referencing a program and supported by DD, "data definition", statements which represent the datasets to be processed. While a job includes one or more programs, or job steps, a single job step may, in turn, represent a procedure, program and/or other process that includes one or more steps, functions, and/or other components that each perform some form of processing. Thus, a job step is a single entry within a job, but is not limited to performing a single step of processing. A job is also often referred to as a batch job, because the collection of JCL is processed in batch by the processor. In this mainframe environment, jobs are continually being processed. These jobs regularly reference datasets (e.g., files) as part of their processing. As such, at any given point in time, some number of jobs may have some number of datasets opened and may be processing data related to those opened datasets. Furthermore, a dataset may be accessed by more than one job, although typically not for writing at the same time. While each individual job may know which dataset(s) the job has opened at any given point in time, the mainframe environment and/or an application for managing the mainframe environment may not know which dataset(s) are opened and/or which job is processing which dataset(s) at that point in time. Thus, if a disaster or some other event occurs that interrupts processing by the mainframe environment or any number of jobs within the mainframe environment, individual(s), group(s) and/or organization(s) faced with restoring processing capabilities of the mainframe environment will not know which dataset(s) were impacted by the disaster or other event. Determining the inconsistencies within and among the various replicated storage systems utilized by a particular mainframe application is difficult because detailed information regarding times at which jobs and/or job steps begin and end and at which the datasets are opened and closed is not readily available.

Several of the examples improve the ability to determine which dataset(s) is/are currently opened and which job(s) is/are currently processing which dataset(s). In one example, system records are utilized to determine which job is currently processing which dataset. For example, a system management facility (SMF) record is generated each time a job is initiated or terminated. An SMF record is also generated, for example, each time a job step within a job is terminated. Furthermore, an SMF record is generated, for example, each time a virtual storage access method (VSAM) dataset is opened or closed as well as each time a non-VSAM dataset is closed. In addition, an OPEN exit routine may generate a record each time a VSAM or non-VSAM dataset is opened. In this example, each of these job related activity records is recorded in a job related activity storage area, such as an open jobs and datasets (OJD) file, where the file itself is a dataset. In the event of a disaster or other interruption of processing in the mainframe environment, the OJD dataset is reviewed, for example, to determine which job was processing which dataset at the time of the event. In this way, jobs and/or datasets can be identified as needing appropriate actions to be taken upon restoration of processing in the mainframe environment.

Reference now is made in detail to the examples illustrated in the accompanying drawings and discussed below.

Figure 1:
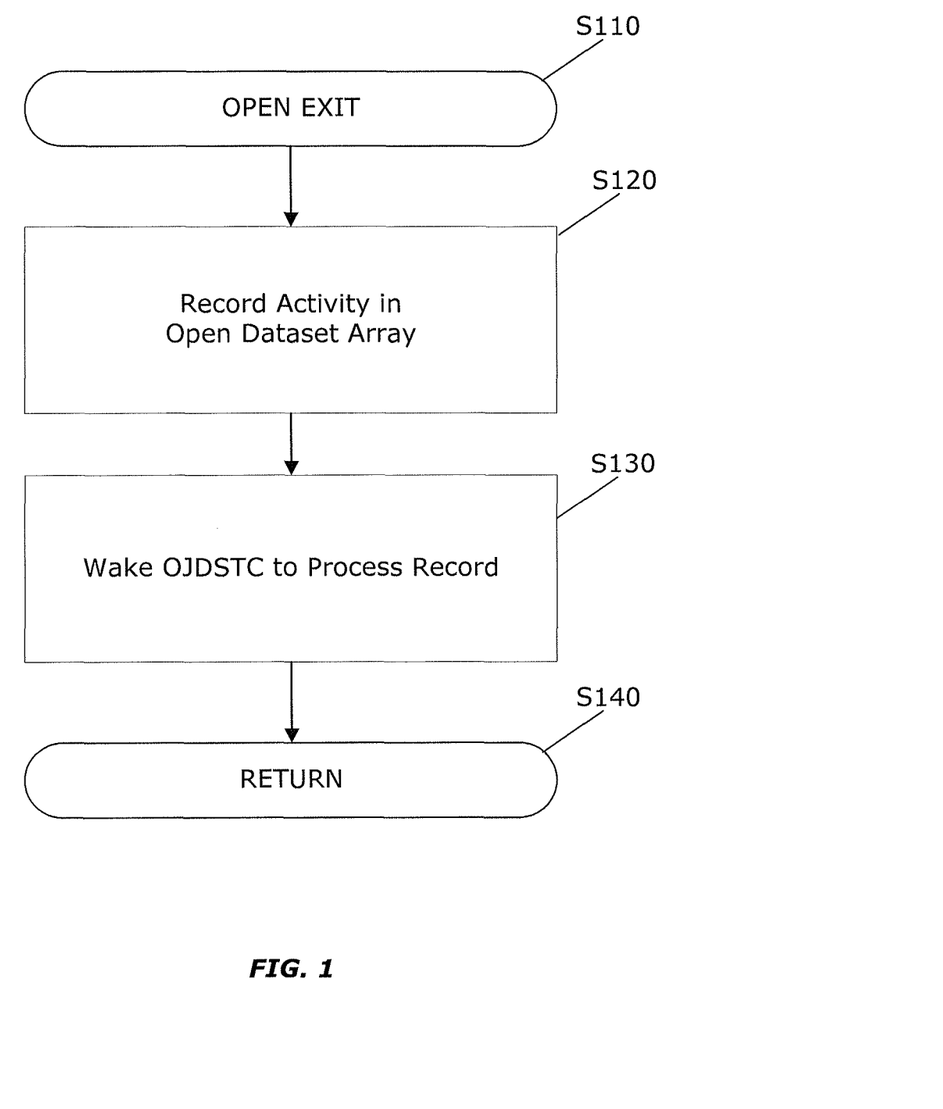
FIG. 1 is a process flow diagram of an example of a process for capturing events during an open exit.

FIG. 1 illustrates an example of a process for capturing the time at which a non-VSAM dataset is opened. An "exit" is a hook or other link within a routine provided by or within an operating system of a mainframe environment. The exit within the routine allows an end-user, such as an individual(s), group(s) and/or organization(s), to perform additional functions to be processed as part of that portion of the routine. Thus, an "open exit" provides an opportunity for an end-user to include additional processing when a non-VSAM dataset is opened. Although this example is focused on a non-VSAM open exit, an open exit is available upon opening any dataset. Furthermore, while an open exit is utilized in the example to identify when a dataset is open, alternative techniques, such as a supervisor call (SVC), a system authorization facility (SAF), or an otherwise non-documented hook, may also be employed to detect such dataset open and perform additional processing related to the dataset open.

When a non-VSAM dataset is opened, for example, an open exit is invoked at step S110. As part of the open exit, the activity of opening the non-VSAM dataset is recorded in an open dataset array in step S120. The open dataset array is, for example, a collection of records that have been loaded into common memory. By loading the open dataset array into common memory, multiple processes may access the collection of records contained within the open dataset array. Each record in the open dataset array is, for example, a record corresponding to an opened dataset, such as a non-VSAM dataset.

As a further part of the open exit, an open jobs and datasets started task (OJDSTC) is awakened and/or otherwise notified of the non-VSAM dataset open, in step S130, so that OJDSTC can process the record recorded in the open dataset array. In step S140, the open exit returns and the process for opening a non-VSAM dataset is then completed.

As noted above, although FIG. 1 depicts a flow performed when an open exit is triggered by opening a non-VSAM dataset, such flow may also be performed when an open exit is triggered by opening a VSAM dataset. Furthermore, such flow may be performed when triggered by any alternative technique such as an SVC, an SAF or an otherwise non-documented hook that detects a dataset open. For example, the flow depicted in FIG. 1 may be performed as part of a front end to an SVC. Alternatively, or in addition, such flow may be performed during security processing as part of an SAF exit (e.g., ICHRTX00 exit or ICHRTX01 exit).

In addition, although FIG. 1 depicts performing steps S120 and S130 for any open dataset, such steps may alternatively be conditioned on whether the job responsible for opening the dataset is "tagged". A job is tagged, for example, if the job is identified as critical, vital or as being a production job. Tagging is achieved by writing to a user communication area within the control blocks of the identified job. Such tagging is performed, for example, during a user job initiation (UJI) exit (e.g., Vital File Identifier UJI (VFIUJI)). In this way, only those datasets opened by tagged jobs will be recorded in the open dataset array (e.g., step S120) and OJDSTC will only be wakened to process those limited records (e.g., step S130).

Figure 2:
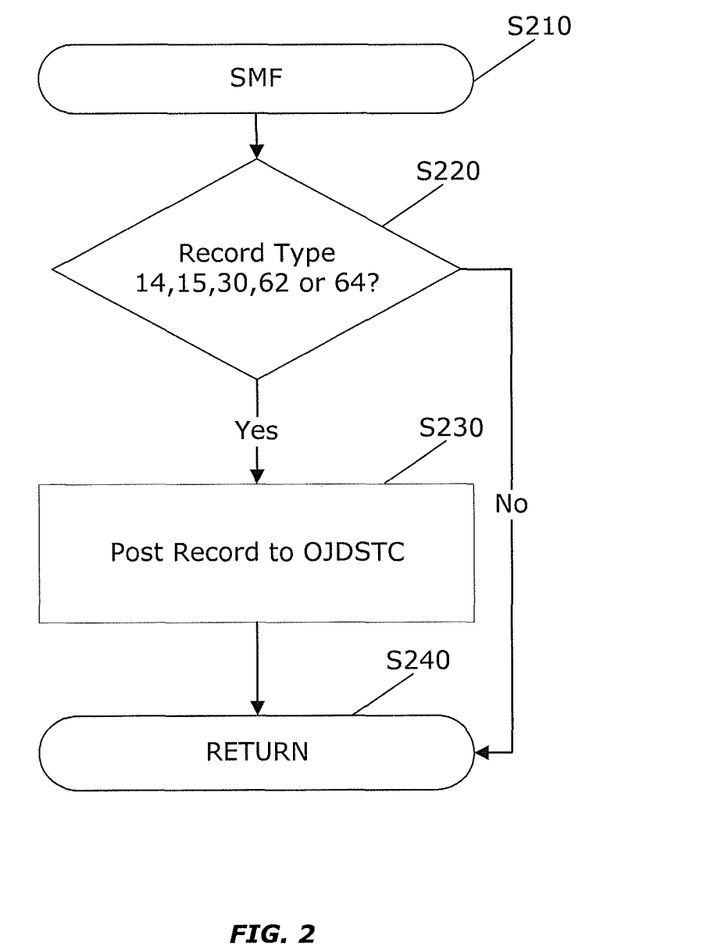
FIG. 2 is a process flow diagram of an example of a process for capturing events from a system management facility.

FIG. 2 illustrates an example of a process for capturing the time at which a job and/or job step begins and ends as well as the time at which a VSAM dataset is opened and a dataset, either VSAM or non-VSAM, is closed. In step S210, an SMF record is generated. An SMF record is generated, for example, for any of various types of activity performed within a mainframe environment. Each SMF record is assigned a type based on the corresponding activity and may also be assigned a sub-type.

In step S220, the generated SMF record is reviewed to determine the assigned type. If the assigned type is one of 14, 15, 30, 62, or 64, the process proceeds to step S230. Otherwise, the process proceeds to step S240 and control is returned to step S210 until another SMF record is generated. Although the current example is focused on identifying the type of SMF record based on an assigned type, no such requirement exists and SMF record type identification can be performed in any number of ways. For example, a textual description contained within an SMF record can be reviewed to determine if the SMF record corresponds to an activity of interest (e.g., dataset open, dataset close, job initiation, job termination, etc.).

An SMF record of type 14 or 15 corresponds to a closure of a non-VSAM dataset. An SMF record of type 30 corresponds to one of initiation of a job, termination of a job, or termination of a job step depending on the sub-type of the SMF record. An SMF record of type 62 corresponds to an opening of a VSAM dataset and an SMF record of type 64 corresponds to a closure of a VSAM dataset. Hence, step S220 filters the generated SMF record so that only an SMF record of a type corresponding to an activity of interest is passed to step S230. As noted above in relation to FIG. 1, dataset opens may be identified in various ways (e.g., open exit, SVC, SAF, etc.). As such, step S220 may alternatively only review SMF records to determine if the assigned type is one of 14, 15 or 30. In this way, filtered SMF records may be limited only to those related to dataset closure or initiation/termination of a job/job step.

In step S230, the filtered SMF record is passed to OJDSTC and, in step S240, control is returned to step S210 until another SMF record is generated. The filtered SMF record is passed to OJDSTC, for example, as a program control (PC) call. A PC call allows a record to be exchanged, for example, between two processes executing within a mainframe environment without terminating either process. In this way, the example process of FIG. 2 continues to receive and filter SMF records while OJDSTC continues to process any filtered records passed in step S230.

Figure 3:
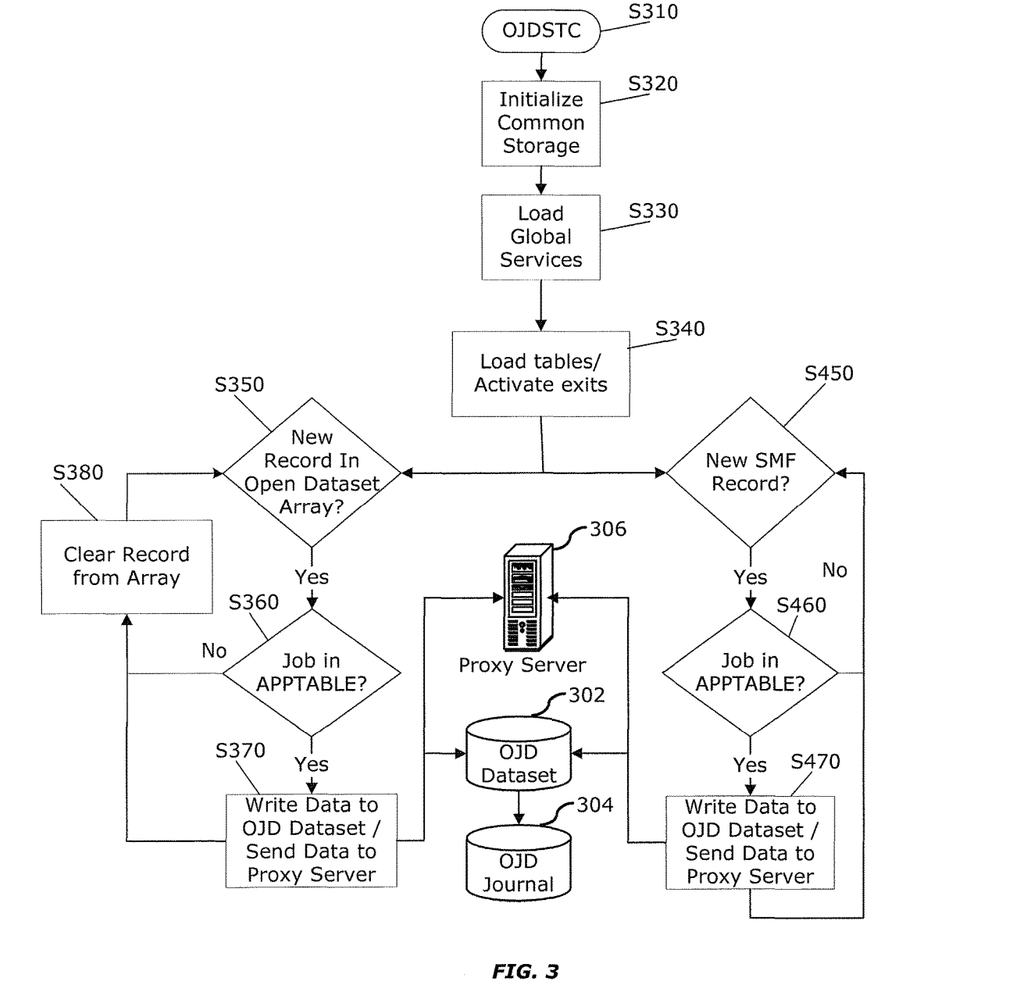
FIG. 3 is a process flow diagram of an example of a method for recording various times related to processing a job, a job step and/or a dataset access.

FIG. 3 illustrates an example of a process for recording various times related to processing a job, a job step and/or a dataset access. That is, the process of FIG. 3 is inter-related with the flows depicted in FIGS. 1-2. In step S310, an open jobs and datasets started task (OJDSTC) is initiated. OJDSTC is, for example, a process that continuously runs once OJDSTC is initiated. When OJDSTC is first initiated, OJDSTC performs steps S320, S330 and S340 once.

In step S320, OJDSTC initializes, for example, a common storage area. The common storage area includes, for example, the open dataset array as described above in relation to FIG. 1. In this way, OJDSTC is able to access records generated by other processes, such as the open exit process of FIG. 1.

OJDSTC, in step S330, also loads, for example, global services. In a mainframe environment including multiple systems, generated records (e.g., SMF records) related to a job being processed within one system are only available within that one system by default. In one example, global services provides the functionality for a process executing within a first system to access generated records from within any of the multiple systems within the mainframe environment. In this example, OJDSTC may execute within the first system and, by loading global services, OJDSTC will have access to records generated from within any system of the mainframe environment. In this way, OJDSTC is able to receive SMF records, such as those filtered SMF records posted in step S230 of FIG. 2.

In step S340, OJDSTC loads various tables and activates various functionalities (e.g., specific user exits and SVCs), as described in greater detail below in relation to FIG. 3A. For example, OJDSTC loads a dataset containing a list of jobs considered to be vital. In one example, the dataset containing the list of vital jobs is an APPTABLE. A job is considered to be vital, for example, if the job references datasets considered to be critical and/or is otherwise identified as vital (e.g., a user, group or organization indicates the job is vital). A referenced dataset is critical, for example, if the dataset provides input to the job during processing of the job.

Once steps S320, S330 and S340 are completed, the process proceeds to each of steps S350 and S450. Step S350 is performed, for example, when OJDSTC is notified that a new record, such as a record related to an opening of a non-VSAM dataset, has been written to the open dataset array as part of an open exit or SVC, such as described above in relation to FIG. 1. When the new dataset opening record is written to the open dataset array, OJDSTC retrieves the new dataset opening record from the open dataset array, in step S350, and the process proceeds to step S360. In step S360, OJDSTC determines if the job corresponding to the new dataset opening record retrieved from the open dataset array is a vital job. For example, OJDSTC reviews a vital jobs dataset (e.g., APPTABLE) to determine if the corresponding job is included. If the corresponding job is not included in the vital jobs dataset (e.g., APPTABLE), the process, in step S380, clears the record from the array and returns to step S350 until OJDSTC is notified of another record written to the open dataset array. If the corresponding job is included in the vital jobs dataset (e.g., APPTABLE), the process continues to step S370.

In step S370, the retrieved dataset opening record is stored for later reference. In one example, the retrieved dataset opening record is stored in a job activity record storage area, such as open jobs and datasets (OJD) dataset 302. OJD dataset 302 is, for example, a dataset that stores any record corresponding to activity of interest related to vital jobs. In a further example, the retrieved dataset opening record is sent to a network-based data store, such as proxy server 306. After the retrieved dataset opening record is stored in the job activity record storage area and/or sent to the network-based data store, control proceeds to step S380, where the record is cleared from the array, and returns to step 350 until another record is written in the open dataset array.

Step S450 is performed, for example, when OJDSTC receives a filtered SMF record, such as described above in relation to FIG. 2. The received filtered SMF record is, for example, an SMF record of type 14, 15, 30, 62 or 64 and/or otherwise corresponds to an activity of interest (e.g., dataset open, dataset close, job initiation, job termination, etc.). After OJDSTC receives the filtered SMF record in step S450, the process proceeds to step S460. In step S460, OJDSTC determines if the job corresponding to the filtered SMF record is a vital job. For example, OJDSTC reviews a vital jobs dataset (e.g., APPTABLE) to determine if the corresponding job is included. If the corresponding job is not included in the vital jobs dataset (e.g., APPTABLE), the process returns to step S450 until OJDSTC receives another filtered SMF record. If the corresponding job is included in the vital jobs dataset (e.g., APPTABLE), the process continues to step S470.

In step S470, similar to step S370, the received filtered SMF record corresponding to a vital job is stored for later reference. In one example, the received filtered SMF record is stored in the job activity record storage area, such as OJD dataset 302. In a further example, the received SMF record is sent to a network-based data store, such as proxy server 306. After the received filtered SMF message is stored in the job activity record storage and/or sent to the network-based data store, control returns to step S450 until another filtered SMF record is received.

In this way, the job activity record storage area, such as OJD dataset 302, contains a record related to each activity of interest (e.g., job initiation, job step termination, dataset opening, dataset closing, or job termination) corresponding to each vital job within a mainframe environment. In particular, the job activity record storage area, such as OJD dataset 302, provides an indication of which jobs are currently processing and which datasets are currently opened. In one example, the job activity record storage area is maintained within a replicated storage system. That is, the job activity record storage area exists, for example, within a primary storage system which is replicated to a secondary storage system. The secondary storage system may exist within the same physical location as the primary storage system or may be located in another physical location. In the event of a disaster or other interruption of processing within the mainframe environment, the job activity record storage area can be reviewed, for example, to determine which jobs were being processed and/or which datasets were opened at the time of the disaster or other interruption of processing, thus improving the response to the disaster or other interruption of processing.

The primary focus of the job activity record storage area (e.g., OJD dataset 302) is, for example, those vital jobs that are currently being processed. When a vital job terminates processing normally, corresponding job activity records can be removed from the job activity record storage area. The corresponding job activity records, however, should not be erased or otherwise lost. In order to limit the job activity record storage area to records related to activities of interest corresponding to vital jobs that are currently running while still preserving records related to activities of interest corresponding to completed vital jobs, records related to activities of interest corresponding to completed vital jobs are removed from the job activity record storage area and placed, for example, in a job activity journal, such as open jobs and datasets (OJD) journal 304. In one example, the job activity journal (e.g., OJD journal 304) is also maintained within a replicated storage system. In this way, the job activity record storage area is limited to records corresponding to currently processing vital jobs while the job activity journal preserves records corresponding to vital jobs that have completed processing. In a further example, the job activity journal may be limited to a period of time (e.g., minutes, hours, days, etc.) such that only records corresponding to vital jobs that have completed processing within the period of time are preserved. As such, any analysis related to a disaster or other interruption of processing includes at least some historical perspective regarding processed and processing jobs as well as open and recently closed datasets.

By referencing a vital jobs table (e.g., APPTABLE) in steps S360 and S460, OJDSTC is able to limit writing job activity records to the job activity record storage area for only those job activities related to vital jobs. As described above in relation to FIG. 1, an alternative to tracking vital jobs by using a vital jobs table involves tagging jobs as vital. When this tagging of vital jobs is performed, steps S360 and S460 involve reviewing the user communication area of the related job to determine whether the job has been tagged as vital. This review of the user communication area is instead of a search of the vital jobs table. As such, tracking vital jobs via tags offers an improvement over repeatedly searching a vital job table for a particular job entry.

Figure 3A:
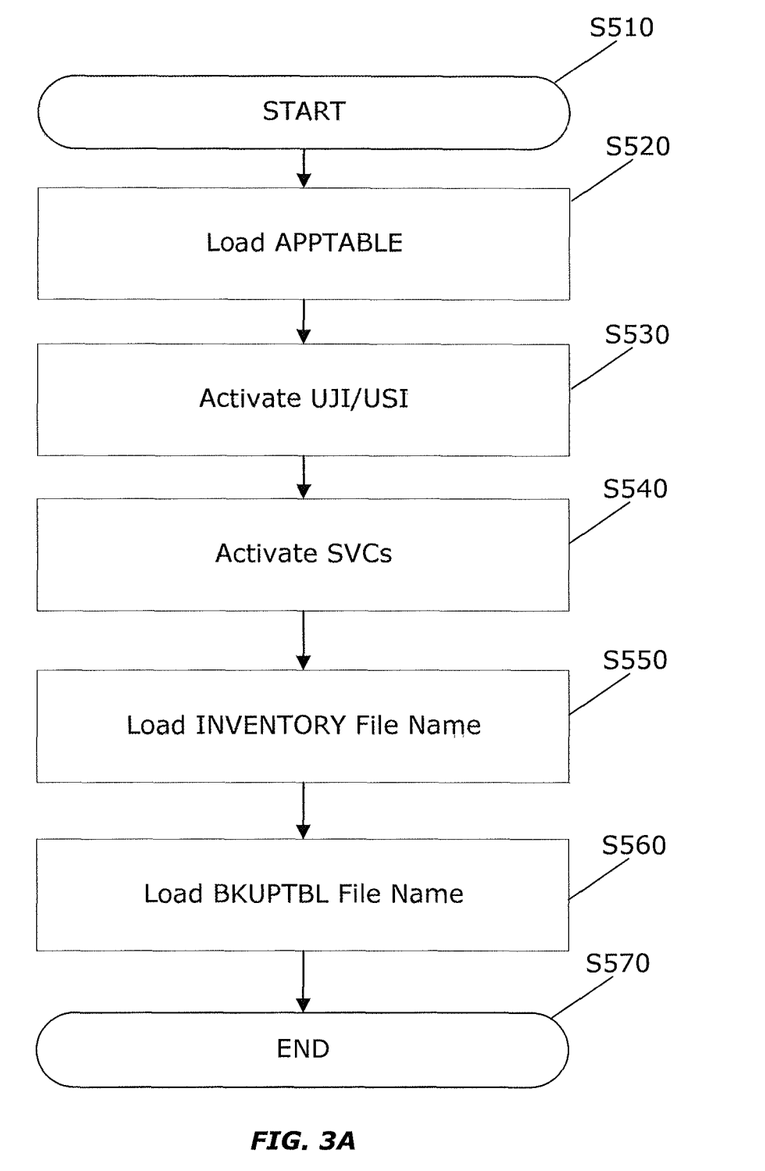
FIG. 3A is a process flow diagram of an example of a process for loading file names and activating exits.

FIG. 3A illustrates an example of a process of various sub-steps performed as part of step S340 of FIG. 3. In step S510, the process starts. In step S520, the process loads, for example, a dataset containing a list of jobs considered to be vital. In one example, the dataset containing the list of vital jobs is an APPTABLE. A job is considered to be vital, for example, if the job references datasets considered to be critical and/or is otherwise identified as vital (e.g., a user, group or organization indicates the job is vital). A referenced dataset is critical, for example, if the dataset provides input to the job during processing of the job.

In step S530, user job initiation (UJI) exit and user step initiation (USI) exit functionality are activated, for example, such that UJI/USI exits will be processed as part of job execution (e.g., UJI when job initiates, USI when a step within the job initiates). As described above, an exit is a hook or other link within a routine. Every possible exit, however, is not always activated within a mainframe environment. As such, in order to utilize a particular exit for executing end-user written commands, the particular exit must be activated within the mainframe environment. In this example, UJI/USI exits are activated in step S530 so that additional processing related to job initiation and step initiation can be performed for each executed job.

In step S40, SVC functionality is activated. As with user exits, SVCs are hooks for which functionality is not always activated within a mainframe environment. Thus, SVC functionality must be activated in order that SVCs may be utilized, particularly as described above in relation to FIG. 1.

In step S550, the process loads a file name for a dataset containing a list of updated datasets that need to be backed-up prior to or as part of a job or job step. This file name, in one example, is referred to as the Inventory file name. The process, in step S560, loads a file name for a dataset containing a list of datasets that have been backed-up. In one example, this file name is referred to as the BKUPTBL file name. The file names in step S550 and S560 (e.g., BKUPTBL, Inventory) are loaded into a common storage area. In step S570, the process ends.

Figure 4:
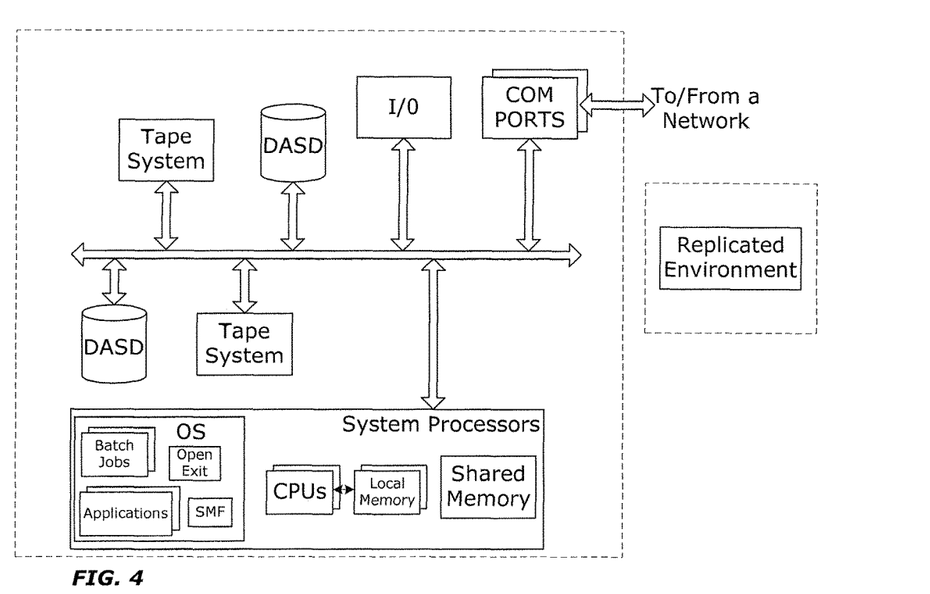
FIG. 4 is a simplified functional block diagram of a computer that may be configured as a server and/or mainframe.
Figure 5:
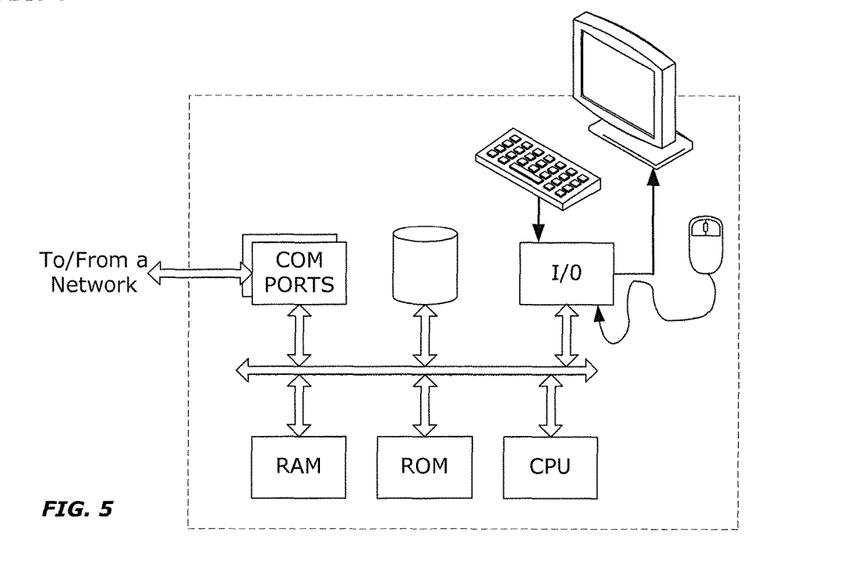
FIG. 5 is a simplified functional block diagram of a personal computer or other work station or terminal device.

FIGS. 4 and 5 provide functional block diagram illustrations of general purpose computer hardware platforms. FIG. 4 illustrates a network or host computer platform, as may typically be used to implement a server and/or mainframe. FIG. 5 depicts a computer with user interface elements, as may be used to implement a personal computer or other type of work station or terminal device, although the computer of FIG. 5 may also act as a server if appropriately programmed. It is believed that the general structure and general operation of such equipment as shown in FIGS. 4 and 5 should be self-explanatory from the high-level illustrations.

A mainframe, for example, includes a data communication interface for packet data communication and an input/output (I/O) controller. The I/O controller manages communication to various I/O elements and storage facilities. Storage facilities include one or more direct access storage devices (DASD) and/or one or more tape systems. Such storage facilities provide storage for data, jobs for managing batch processing and applications. The mainframe includes an internal communication bus providing a channel of communication between the communications ports, the I/O controller, and one or more system processors. Each system processor includes one or more central processing units (CPUs) and local memory corresponding to each CPU, as well as shared memory available to any CPU. An operating system (OS) executed by the system processors manages the various jobs and applications currently running to perform appropriate processing. The OS also provides a system management facility (SMF) and open exit points for managing the operation of the mainframe and the various jobs and applications currently running. The hardware elements, operating systems, jobs and applications of such mainframes are conventional in nature. Of course, the mainframe functions may be implemented in a distributed fashion on a number of similar platforms, to distribute the processing load, and/or replicated across one or more similar platforms, to provide redundancy for the processing. As such, FIG. 4 also depicts a replicated environment. Although details of the replicated environment are not depicted, such replicated environment typically contains similar components as already described in relation to the primary mainframe of FIG. 4.

A computer type user terminal device, such as a PC, similarly includes a data communication interface CPU, main memory and one or more mass storage devices for storing user data and the various executable programs. The various types of user terminal devices will also include various user input and output elements. A computer, for example, may include a keyboard and a cursor control/selection device such as a mouse, trackball, or touchpad; and a display for visual outputs. The hardware elements, operating systems and programming languages of such user terminal devices also are conventional in nature.

Hence, aspects of the methods for recording the time each step within a job executing within a mainframe computing environment begins and ends outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through a global information network (e.g. the Internet®) or various other telecommunication networks. Such communications, for example, may enable loading of the software from one computer or processor into another, for example, from a management server or host computer such as proxy server 306 into the mainframe platform that will execute the various jobs. Thus, another type of media that may bear the software elements includes optical, electrical and electromagnetic waves, such as used across physical interfaces between local devices, through wired and optical landline networks and over various air-links. As used herein, unless restricted to non-transitory, tangible "storage" media, terms such as computer or machine "readable medium" refer to any medium that participates in providing instructions to a processor for execution.

Non-volatile storage media include, for example, optical or magnetic disks, such as any of the storage devices in any computer(s) or the like, such as may be used to hold datasets and programs for enterprise applications. Volatile storage media include dynamic memory, such as main memory of such a computer platform. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge or any other medium from which a computer can read programming code and/or data. Many of these forms of computer readable media may be involved in carrying one or more sequences of one or more instructions to a processor for execution.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A system for use in restoring data processing capabilities in the event of an interruption, comprising:
a processor;
a storage device accessible by the processor; and
an activity tracking program in the storage device, wherein execution of the activity tracking program by the processor configures the system to:
receive an indication of an activity related to a job, the job comprising:
one or more commands to be executed by the processor, each command including a job step within the job, and
one or more dataset references, each dataset reference including a dataset name of a dataset to be accessed by a related one of the one or more commands,
generate a system record each time the job is initiated or terminated, and each time the dataset is opened or closed,
store the system record of the dataset accessed by the job in a dataset array associated to the job,
upon a determination from the system record that the system record is new, determine whether the dataset is a new dataset,
upon a determination from the system record that the dataset is a new dataset, determine whether the job is vital,
upon a determination the job is vital:
link the new dataset to the vital job and to the dataset array,
generate a job activity record identifying the vital job, capturing the time of the activity related to the vital job, and identifying and categorizing a dataset being processed by the vital job,
upon a determination that the vital job is currently being processed, store the job activity record in a job activity record storage area for use in restoring the data processing capabilities,
upon a determination that the vital job is complete, journal the new dataset in a journal storage area and clear the new dataset from the dataset array, and
restore data processing capabilities of the system after the interruption is detected, the record identifying the jobs and the datasets being processed by the job at the time of the interruption.

2. The system of claim 1, further comprising a hook processing program in the storage device, wherein execution of the hook processing program by the processor configures the system to implement functions, including functions to:
upon receipt of a hook indicating a closed dataset was opened by the job, create an open dataset record and add the created open dataset record to an open dataset array within a common storage area of the system; and
send, as the indication of the activity related to the job, a cross memory post to the activity tracking program.

3. The system of claim 2, wherein the hook is one of:
a supervisor call; and
an open exit.

4. The system of claim 1, further comprising a hook processing program in the storage device, wherein execution of the hook processing program by the processor configures the system to implement functions, including functions to:
upon receipt of a hook indicating a closed dataset was opened by the job, review a user communication area of the job; and
upon a determination that the user communication area of the job includes a tag indicating the job is vital:
create an open dataset record and add the created open dataset record to an open dataset array within a common storage area of the system; and
send, as the indication of the activity related to the job, a cross memory post to the activity tracking program.

5. The system of claim 4, wherein the hook is one of:
a supervisor call; and
an open exit.

6. The system of claim 1, further comprising a log record processing program in the storage device, wherein execution of the log record processing program by the processor configures the system to implement functions, including functions to:
upon receipt of a log record including an indication of an event initiated by the job:
create a log record message; and
send, as the indication of the activity related to the job, the created log record message to the activity tracking program.

7. The system of claim 6, wherein the event initiated by the job is one of:
initiation of the job;
initiation of a job step within the job;
termination of a job step within the job; and
termination of the job.

8. The system of claim 1, wherein the implemented function to determine whether a job is vital further implements functions, including functions to:
review a user communication area of the job; and
upon a determination that the user communication area of the job includes a tag indicating the job is vital, determine that the job is vital.

9. The system of claim 1, wherein the implemented function to determine whether a job is vital further implements functions, including functions to:
reference a vital job table to determine whether an entry for the job exists; and
upon a determination that an entry for the job exists, determine that the job is vital.

10. An article of manufacture for use in restoring data processing capabilities in the event of an interruption, comprising:
a non-transitory machine readable medium; and
an activity tracking program embodied in the medium, wherein execution of the activity tracking program by a processor configures the processor to:
receive an indication of an activity related to a job, the job comprising:
one or more commands to be executed by the processor, each command including a job step within the job, and
one or more dataset references, each dataset reference including a dataset name of a dataset to be accessed by a related one of the one or more commands,
generate a system record each time the job is initiated or terminated, and each time the dataset is opened or closed, store the system record of the dataset accessed by the job in a dataset array associated to the job, upon a determination from the system record that the system record is new, determine whether the dataset is a new dataset, upon a determination from the system record that the dataset is a new dataset, determine whether the job is vital, upon a determination the job is vital:
   link the new dataset to the vital job and to the dataset array,
   generate a job activity record identifying the vital job, capturing the time of the activity related to the vital job, and identifying and categorizing a dataset being processed by the vital job,
   upon a determination that the vital job is currently being processed, store the job activity record in a job activity record storage area for use in restoring data processing capabilities,
   upon a determination that the vital job is complete, journal the new dataset in a journal storage area and clear the new dataset from the dataset array, and
   restore data processing capabilities of the system after the interruption is detected, the record identifying the jobs and the datasets being processed by the job at the time of the interruption.

11. The article of claim 10, further comprising a hook processing program embodied in the medium, wherein execution of the hook processing program by the processor supports functions, including functions to:
   upon receipt of a hook indicating a closed dataset was opened by the job, create an open dataset record and add the created open dataset record to an open dataset array within a common storage area of the system, the hook being one of a supervisor call and an open exit; and
   send, as the indication of the activity related to the job, a cross memory post to the activity tracking program.

12. The article of claim 10, further comprising a hook processing program embodied in the medium, wherein execution of the hook processing program by the processor supports functions, including functions to:
   upon receipt of a hook indicating a closed dataset was opened by the job, review a user communication area of the job, the hook being one of a supervisor call and an open exit; and
   upon a determination that the user communication area of the job includes a tag indicating the job is vital:
      create an open dataset record and add the created open dataset record to an open dataset array within a common storage area of the system; and
      send, as the indication of the activity related to the job, a cross memory post to the activity tracking program.

13. The article of claim 10, further comprising a log record processing program embodied in the medium, wherein execution of the log record processing program by the processor supports functions, including functions to:
   upon receipt of a log record including an indication of an event initiated by the job, the event being one of job initiation, job step initiation, job step termination and job termination:
      create a log record message; and
      send, as the indication of the activity related to the job, the created log record message to the activity tracking program.

14. The article of claim 10, wherein the supported function to determine whether the job is vital further includes functions to:
   review a user communication area of the job; and
   upon a determination that the user communication area of the job includes a tag indicating the job is vital, determine that the job is vital.

15. The article of claim 10, wherein the supported function to determine whether the job is vital further includes functions to:
   reference a vital job table to determine whether an entry for the job exists; and
   upon a determination that an entry for the job exists, determine that the job is vital.

16. A method for use in restoring data processing capabilities in the event of an interruption, comprising:
   receiving, by a job activity tracking process executing on a processor, an indication of an activity related to a job, the job comprising:
      one or more commands to be executed by the processor, each command including a job step within the job, and
      one or more dataset references, each dataset reference including a dataset name of a dataset to be accessed by a related one of the one or more commands,
   generating a system record each time the job is initiated or terminated, and each time the dataset is opened or closed,
   storing the system record of the dataset accessed by the job in a dataset array associated to the job,
   upon a determination from the system record that the system record is new, determining whether the dataset is a new dataset,
   upon a determination from the system record that the dataset is a new dataset, determining, by the job activity tracking process, whether the job is vital,
   upon determining the job is vital:
      link the new dataset to the vital job and to the dataset array,
      generating a job activity record identifying the vital job, capturing the time of the activity related to the vital job, and identifying and categorizing a dataset being processed by the vital job,
      upon a determination that the vital job is currently being processed, storing the job activity record in a job activity record storage area for use in restoring the data processing capabilities,
      upon a determination that the vital job is complete, journal the new dataset in a journal storage area and clear the new dataset from the dataset array, and
      restore data processing capabilities of the system after the interruption is detected, the record identifying the jobs and the datasets being processed by the job at the time of the interruption.

17. The method of claim 16, further comprising:
   receiving, by a hook processing process executing on the processor, an indication that the job opened a closed dataset, the indication being one of a supervisor call and an open exit;
   creating an open dataset record;
   adding the created open dataset record to an open dataset array within a common storage area of the system; and
   sending, as the indication of the activity related to the job, a cross memory post to the activity tracking process.

18. The method of claim 16, further comprising:

receiving, by a hook processing process executing on the processor, an indication that the job opened a closed dataset, the indication being one of a supervisor call and an open exit;

determining, by the hook processing process, whether a user communication area of the job includes a tag indicating the job is vital; and upon determining that the user communication area of the job includes the tag:

creating an open dataset record;

adding the created open dataset record to an open dataset array within a common storage area of the system; and sending, as the indication of the activity related to the job, a cross memory post to the activity tracking process.

19. The method of claim 16, further comprising:

receiving, by a log record processing process executing on the processor, a log record including an indication of an event initiated by the job, the event being one of job initiation, job step initiation, job step termination and job termination;

creating a log record message; and sending, as the indication of the activity related to the job, the created log record message to the activity tracking process.

20. The method of claim 16, wherein the step of determining whether the job is vital further comprises:

reviewing a user communication area of the job;

determining whether the user communication area of the job includes a tag indicating the job is vial; and upon determining that the user communication area includes the tag, determining that the job is vital.

* * * * *

UNITED STATES PATENT AND TRADEMARK OFFICE
CERTIFICATE OF CORRECTION

PATENT NO. : 10,223,232 B2
APPLICATION NO. : 14/716029
DATED : March 5, 2019
INVENTOR(S) : Paul J. Eckert

Page 1 of 1

It is certified that error appears in the above-identified patent and that said Letters Patent is hereby corrected as shown below:

In the Claims

Column 16, Line 16, Claim 20, delete "vial" and insert -- vital --.

Signed and Sealed this
Eleventh Day of June, 2019

Andrei Iancu
*Director of the United States Patent and Trademark Office*